United States Patent
Thorman (10) Patent No.: US 7,169,727 B2
(45) Date of Patent: Jan. 30, 2007

(54) PROCESS FOR FORMING A ZIEGLER-NATTA CATALYST SYSTEM HAVING A CONTROLLED MORPHOLOGY

(75) Inventor: Joseph Lyndon Thorman, League City, TX (US)

(73) Assignee: Fina Technology, Inc., Houston, TX (US)

( * ) Notice: Subject to any disclaimer, the term of this patent is extended or adjusted under 35 U.S.C. 154(b) by 204 days.

(21) Appl. No.: 10/898,739

(22) Filed: Jul. 26, 2004

(65) Prior Publication Data

US 2005/0004329 A1   Jan. 6, 2005

Related U.S. Application Data

(62) Division of application No. 10/447,914, filed on May 29, 2003, now Pat. No. 6,767,857.

(51) Int. Cl.
*B01J 31/00* (2006.01)
(52) U.S. Cl. .................. 502/133; 502/103; 502/76; 502/125; 502/121; 526/124.3; 526/124.2; 526/124.6
(58) Field of Classification Search ............... 502/76, 502/103, 125, 133, 121; 526/124.3, 124.2, 526/124.6
See application file for complete search history.

(56) References Cited

U.S. PATENT DOCUMENTS

| | | | | |
|---|---|---|---|---|
| 4,107,413 A | 8/1978 | Giannini et al. | ............. | 526/114 |
| 4,114,319 A | 9/1978 | Governale | .................... | 49/488 |
| 4,124,532 A | 11/1978 | Giannini et al. | ............. | 252/429 |
| 4,220,554 A | 9/1980 | Scata et al. | .................. | 252/429 |
| 4,294,721 A | 10/1981 | Ceccin et al. | ................ | 252/429 |
| 4,439,540 A | 3/1984 | Ceccin et al. | ................ | 502/125 |
| 4,460,701 A | 7/1984 | Terano et al. | ................ | 502/104 |
| 4,562,173 A | 12/1985 | Terano et al. | ................ | 502/127 |
| 4,634,687 A | 1/1987 | Fujita et al. | ................. | 502/121 |
| 4,657,882 A | 4/1987 | Karayannis et al. | ........ | 502/115 |
| 4,673,662 A | 6/1987 | Bailly | ........................ | 502/115 |
| 4,721,763 A | 1/1988 | Bailly et al. | .................. | 526/88 |
| 4,784,983 A * | 11/1988 | Mao et al. | .................. | 502/111 |
| 4,861,847 A | 8/1989 | Mao et al. | .................. | 526/125 |
| 5,066,738 A | 11/1991 | Ewen | .......................... | 526/124 |
| 5,098,875 A | 3/1992 | Bailly et al. | .................. | 502/10 |
| 5,227,355 A * | 7/1993 | Seppala et al. | ............. | 502/125 |
| 5,945,366 A | 8/1999 | Kataoka et al. | ............. | 502/127 |
| 6,051,524 A | 4/2000 | Karayannis et al. | ........ | 502/113 |
| 6,376,417 B1 | 4/2002 | Yang et al. | ................. | 502/121 |
| 6,399,837 B1 | 6/2002 | Wilson et al. | .............. | 568/648 |

FOREIGN PATENT DOCUMENTS

EP   1083187   3/1999

* cited by examiner

*Primary Examiner*—Ling-Sui Choi
(74) *Attorney, Agent, or Firm*—Tenley R. Krueger; Diane L. Kilpatrick-Lee (57) ABSTRACT

A pre-catalyst is formed by reacting butylethylmagnesium with an alcohol to form a magnesium alkoxide compound, followed by contacting the magnesium alkoxide compound with a phosphorous compound to form a magnesium alkoxide phosphorous compound mixture. The magnesium alkoxide phosphorous compound mixture is subsequently reacted with $TiCl_4$ to form a $MgCl_2$ support. The $MgCl_2$ support is then contacted with an internal donor while being heated to form a first catalyst slurry, which is then contacted with $TiCl_4$ while being heated to form a second catalyst slurry. The second catalyst slurry is next contacted with $TiCl_4$ while being heated to form a third catalyst slurry, which is washed and dried, resulting in a highly active pre-catalyst with controlled morphology. The pre-catalyst may be combined with one or more co-catalysts and optionally one or more external electron donors to form an active catalyst system, which may be used for the polymerization of olefins.

24 Claims, 4 Drawing Sheets

PROCESS FOR FORMING A ZIEGLER-NATTA CATALYST SYSTEM HAVING A CONTROLLED MORPHOLOGY

CROSS-REFERENCE TO RELATED APPLICATIONS

This application is a divisional of application Ser. No. 10/447,914, filed May 29, 2003, now U.S. Pat. No. 6,767,875.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention generally relates to forming a Ziegler-Natta catalyst system for use in the polymerization of alpha-olefins, for example polypropylene. More specifically, the invention relates to forming a Ziegler-Natta pre-catalyst component by reacting a phosphorous compound with a magnesium alkoxide to facilitate precipitation of a magnesium chloride catalyst support wherein the magnesium alkoxide component is formed by reacting butylethylmagnesium with an alcohol.

BACKGROUND OF THE INVENTION

Olefins, also called alkenes, are unsaturated hydrocarbons whose molecules contain one or more pairs of carbon atoms linked together by a double bond. When subjected to a polymerization process, olefins are converted to polyolefins such as polypropylene. One commonly used polymerization process involves contacting the olefin monomer with a Ziegler-Natta catalyst system that includes a conventional Ziegler-Natta pre-catalyst (also referred to herein as a pre-catalyst component), a co-catalyst, and one or more electron donors. Examples of such catalyst systems are provided in U.S. Pat. Nos. 4,107,413; 4,294,721; 4,439,540; 4,114,319; 4,220,554; 4,460,701; 4,562,173; and 5,066,738, which are incorporated by reference herein.

The pre-catalyst component of a conventional Ziegler-Natta catalyst system is comprised of a transition metal compound supported on an inert solid such as a magnesium compound. The transition metal compound is generally represented by the formula:

$MR_x$ where M is a transition metal, R is a halogen, an alkoxy, or a hydrocarboxyl group, and x is the valence of the transition metal. Typically, M is a group IV–VIB metal such as titanium, chromium, or vanadium, and R is chlorine, bromine, carbonate, ester, or an alkoxy group. Common transition metal compounds are $TiCl_4$, $TiBr_4$, $Ti(OC_2H_5)_3Cl$, $Ti(OC_3H_7)_2Cl_2$, $Ti(OC_6H_{13})_2Cl_2$, $Ti(OC_2H_5)_2Br_2$, and $Ti(OC_{12}H_{25})Cl_3$.

An internal electron donor is typically added to the Ziegler-Natta pre-catalyst during its preparation and can be combined with the support or otherwise complexed with the transition metal compound. Examples of internal electron donors include amines, amides, esters, ketones, nitriles, ethers, and phosphines. The internal electron donor is used to reduce the atactic form of the resulting polymer, thus decreasing the amount of xylene solubles fraction of the produced resin. A polymer is "atactic" when its pendant groups are arranged in a random fashion on both sides of the chain of the polymer. In contrast, a polymer is "isotactic" when all of its pendant groups are arranged on the same side of the chain and "syndiotactic" when its pendant groups alternate on opposite sides of the chain. Isotactic and syndiotactic polyolefins have better mechanical properties than atactic polyolefins. For example, isotactic and syndiotactic polyolefins, unlike atactic polyolefins, can be formed into crystals and fibers because the regular arrangement of their atoms allows them to be easily packed together.

During the polymerization process, an external electron donor may be added as another component of the catalyst system to further control the amount of atactic polymer produced. Examples of commonly used external electron donors include organosilicon compounds, such as diphenyldimethoxysilane (DPMS), cyclohexylmethyldimethoxysilane (CMDS), and dicyclopentyldimethoxysilane (CPDS). A co-catalyst, such as an organoaluminum compound, also may be used in conjunction with the Ziegler-Natta pre-catalyst to activate the catalyst system.

In the polymerization process, hydrogen is fed to the catalyst system to terminate the chain formation of the polymer, thereby controlling the molecular weight and the melt flow rate of the polymer. The hydrogen response of the Ziegler-Natta catalyst system affects the molecular weight of the polymer produced. In particular, an increase in hydrogen response produces a lower molecular weight polymer (i.e., shorter chain length), and a decrease in hydrogen response produces a higher molecular weight polymer (i.e., longer chain length). As molecular weight decreases, the melt flow rate (MFR) of the polymer increases. Polyolefins having relatively high MFR values offer numerous processing advantages. For example, lower temperatures and lower die pressures are required for the extrusion of such polyolefins. Further, the use of such polyolefins reduces the wear on the extrusion equipment. A Ziegler-Natta catalyst system having a relatively high hydrogen response is thus needed to better control the molecular weights of the polymers produced using the catalyst.

The properties of the polymerization catalyst system affect the properties of the polymer formed. For example, polymer morphology typically depends upon catalyst morphology. Good polymer morphology includes uniformity of particle size and shape and minimization of the number of very small particles (i.e., fines) in the polymer to avoid plugging process transfer and recycle lines. Very large particles also must be minimized to avoid formation of lumps and strings in the polymerization reactor. Unfortunately, modification of conventional supported catalysts to optimize morphology typically sacrifices the original activity and stereospecificity of the catalysts.

The present invention provides a process for forming a Ziegler-Natta catalyst system that can be used to produce polyolefins with desired properties. The pre-catalyst formed in accordance with the present invention is highly active and has a satisfactory morphology that can be controlled by varying the amount of phosphorous compound used to form the catalyst system. Furthermore, the catalyst has a relatively high hydrogen response, allowing for better control of the molecular weight of the polymer chain. The polypropylene also contains a low level of xylene solubles, which indicates that the atactic form of the polymer is also low.

SUMMARY OF THE INVENTION

The present invention includes a process for forming a catalyst system for use in the polymerization of olefins, particularly propylene. This process comprises forming a pre-catalyst by reacting butylethylmagnesium (BEM) with an alcohol to form a magnesium alkoxide compound, followed by contacting the magnesium alkoxide compound with a phosphorous compound to form a magnesium alkoxide phosphorous mixture. In an embodiment, the phosphorous compound is tri-n-butylphosphate (BP). The magnesium alkoxide phosphorous mixture is subsequently reacted with a precipitation agent, e.g., titanium tetrachloride ($TiCl_4$) to form a predominantly magnesium chloride ($MgCl_2$) support.

The $MgCl_2$ containing support is then contacted with an internal donor, such as di-n-butylphthalate (D"BP), thereby forming a first catalyst slurry. The first catalyst slurry is then contacted with $TiCl_4$, thereby forming a second catalyst slurry. The second catalyst slurry is next contacted with $TiCl_4$, thereby forming a third catalyst slurry. The third catalyst slurry is washed and optionally dried, resulting in a subsequent highly active pre-catalyst having desirable morphology. The pre-catalyst may be combined with one or more co-catalysts and optionally one or more external electron donors to form an active catalyst system, which may be used for the polymerization of olefins.

DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

According to an embodiment of the invention, a Ziegler-Natta pre-catalyst is formed using a process comprising several steps. First, a magnesium alkyl compound (i.e., $Mg(R')_2$, where R' may be the same or different alkyl group having about 1 to 10 carbon atoms), for example BEM, is combined with an alcohol in a solvent such as heptane or toluene. The BEM may optionally contain one or more viscosity modifying agents, for example triethylaluminum (TEAl), which may be advantageous in preparing the support. The BEM, which is highly soluble, reacts with the alcohol to form a highly soluble magnesium alkoxide compound in accordance with the following reaction:

BEM+2ROH→Mg(OR)$_2$ where R is an alkyl group containing, e.g., about 1 to 20 carbon atoms. The alcohol represented by the formula ROH may be branched or non-branched. Examples of suitable alcohols include 2-ethyl hexanol, methanol, ethanol, propanol, isopropanol, butanol, sec-butanol, and combinations thereof. A suitable alcohol is 2-ethyl hexanol.

Any suitable reaction conditions for converting the BEM and alcohol(s) to a magnesium alkoxide compound may be used. In an embodiment, the reaction is performed at ambient temperature and pressure for about two hours.

A phosphorous containing compound is thereafter added to the resulting solution containing the magnesium alkoxide compound to form a mixture of the two compounds. The phosphorous compound may be a single compound or a combination of phosphorous compounds generally represented by the formula:

$PX_n$ where n is 3, 4, or 5, and each X may be the same or different and is selected from the group consisting of group 17 elements (i.e., halogens including fluorine, chlorine, bromine, iodine), group 18 elements (i.e., chalcogens including oxygen, sulfur, selenium, tellurium), R, ChR, $(RO)_2P(O)$, or $(RO)_2P(O)O$, and where Ch represents a chalcogen and R represents a hydrogen or a hydrocarbyl group, desirably containing about 1 to 12 carbon atoms. The phosphorous compound may be an organic phosphate, organic phosphine, or combinations thereof. In an embodiment, the phosphorous compound is $PH_3$, $P_4O_{10}$, tri-n-butylphosphate, or combinations thereof. In an embodiment, the phorphorous compound is tri-n-butylphosphate (BP).

The amount of BP mixed with the magnesium alkoxide compound ranges from about 0.1 to about 3.0 molar equivalents of BP, desirably from about 0.5 to about 1.5 molar equivalents of BP, wherein the term "molar equivalents" is herein defined as being based on 1 mole of Mg in the BEM. As shown in the above reaction, a desirable equivalent of BP is 1.0. Any suitable conditions for forming the magnesium alkoxide phosphorous compound may be employed for this process. In an embodiment, the process is carried out at ambient temperature for a period of about ten minutes.

Subsequently, the magnesium alkoxide phosphorous compound is combined with a precipitating agent in solvent, e.g., heptane or toluene, to form a $MgCl_2$ support. Any suitable compound, e.g., a titanium halide compound, for causing a $MgCl_2$ precipitate to form upon contact with the mixture may serve as the precipitating agent. In an embodiment, the precipitating agent is $TiCl_4$. From about 1 to about 500 molar equivalents, alternatively from about 1 to about 100 molar equivalents, and alternatively from about 1 to about 10 molar equivalents of $TiCl_4$ are introduced to the mixture solution. The reaction may be carried out at any suitable conditions for precipitating the support comprising $MgCl_2$. The reaction temperature may be from about 0° C. to about 50° C., desireably about 25° C. In an embodiment, the $TiCl_4$ is added drop-wise to the solution over a period of about one hour while maintaining the solution at ambient temperature. The support comprising $MgCl_2$ precipitates out at a relatively slow rate sufficient to form solid particles.

After separating the support from the reaction mixture, the support may be washed with, e.g., toluene, and then optionally dried. The support is then combined with a solvent such as toluene, followed by heating the resulting slurry to a temperature ranging from about 70° C. to about 110° C. An internal donor is thereafter added to the slurry, and the heating of the slurry is continued to allow the following reaction to occur:

Support+0.12 D"BP→Catalyst Slurry A

Any electron donor compatible with the support may serve as the internal electron donor. Examples of suitable internal electron donors include diethers, succinates, phthalates such as those disclosed in U.S. Pat. No. 5,945,366, incorporated herein by reference, dialkoxybenzenes such as those disclosed in U.S. Pat. No. 6,399,837, incorporated herein by reference, and combinations thereof The internal electron donor may comprise a phthalate molecule. In an embodiment, the internal electron donor is a diester of aromatic dicarboxylic acid and/or a diester of phthalic acid, wherein R groups within the ester are selected from general hydrocarbyls. In an embodiment, the internal electron donor is di-n-butylphthalate (D"BP). In an embodiment, from about zero to 1.0 molar equivalents, alternatively from about 0.06 to about 0.12 molar equivalents, of D"BP is added to the $MgCl_2$ support, which is then heated at a temperature of about 85° C. for about ten minutes.

After separating the solid from slurry A, a solvent such as toluene is added to the solid. The resulting solution is then heated to a temperature ranging from about 25° C. to about 150° C., desirably from about 70° C. to about 115° C., followed by adding a Ti halide compound, for example $TiCl_4$, to the solution. The $TiCl_4$ may be added in high concentration via a single treatment, or alternatively may be added more efficiently by using a lesser concentration over a plurality of treatment steps, desirably two treatment steps as described below. Heating of the solution is continued to allow the following reaction to occur:

Catalyst Slurry A+3$TiCl_4$→Catalyst Slurry B

In an embodiment, from about 1 to about 500 molar equivalents of $TiCl_4$, alternatively from about 3 to about 12 molar equivalents of $TiCl_4$, are added to slurry A, which is then heated at a temperature of about 85° C. for about one hour to form slurry B. Slurry B is then subjected to the same procedure as was slurry A, thereby forming catalyst slurry C in accordance with the following equation:

Catalyst Slurry B+3$TiCl_4$→Catalyst Slurry C

Slurry C is desirably washed once with 1,2-dichloroethane (DCE) and with hexane and then optionally dried under vacuum to complete formation of the pre-catalyst. The DCE wash is optional and may not be necessary where sufficient $TiCl_4$ is used in the formation of the support and in the $TiCl_4$ treatments. The resulting pre-catalyst comprises about 1–5 wt. % Ti, about 14–25 wt. % Mg, about 55–75 wt. % Cl, and about 2–35 wt. % D"BP, and alternatively about 2 wt. % Ti, about 18 wt. % Mg, about 62 wt. % Cl, and about 10 wt. % D"BP, all based on the total weight of the pre-catalyst. The pre-catalyst primarily consists of agglomerated spheroids, and the weight average particle size ($d_{50}$) of the polymer particles is about 150 to about 500 micrometers (microns).

The pre-catalyst may be combined with one or more co-catalysts and optionally one or more external electron donors to form an active catalyst system, which may be used for the polymerization of olefins. Co-catalyst suitable for use include known Zeigler-Natta co-catalysts such as aluminum compounds, particularly organoaluminum compounds. Examples of organoaluminum compounds include aluminum alkyls of the formula $AlR'_3$ where R' is an alkyl having one to about eight carbon atoms, R' being the same or different. Examples of aluminum alkyls include trimethyl aluminum (TMA), triethyl aluminum (TEAl), and triisobutyl aluminum (TiBAl). In an embodiment, the co-catalyst is TEAl.

External electron donors suitable for use in the catalyst system include known Zeigler-Natta external electron donors such as monofunctional or polyfunctional carboxylic acids, carboxylic anhydrides and carboxylic esters, also ketones, ethers, alcohols, lactones and organophosphorus and organosilicon compounds. The external electron donor compounds can be identical to or different from the internal electron donor compounds used for preparing the pre-catalyst compound. Examples of external electron donor compounds include organosilicon compounds of the formula $R^1_n Si(OR^2)_4$, where $R^1$ are identical or different and are each a $C_1$–$C_{20}$-alkyl group; a 5- to 7-membered cycloalkyl group which may in turn bear $C_1$–$C_{10}$-alkyl groups as substituents; a $C_6$–$C_{18}$-aryl group or a $C_6$–$C_{18}$-aryl-$C_1$–$C_{10}$-alkyl group; $R^2$ are identical or different and are each a $C_1$–$C_{20}$-alkyl groups; and n is 1, 2 or 3. In certain embodiments of the organosilicon compounds, $R^1$ is a $C_1$–$C_8$-alkyl group or a 5- to 7-membered cycloalkyl group or a saturated or unsaturated heteroatom containing group, the heteroatom being N, O, P, Al, B, or Si contained in a cyclic or acyclic, or branched configuration contang 3 to 18 atoms excluding hydrogen atoms and $R^2$ is a $C_1$–$C_4$-alkyl group and n is 1 or 2. Examples of suitable organosilicon compounds include diisopropyldimethoxysilane, isobutyl-isopropyldimethoxysilane, diisobutyldimethoxysilane, dicyclopentyldimethoxysilane, dicyclohexyldimethoxysilane, cyclohexylmethyldimethoxysilane (CMDS), isopropyl-tert-butyldimethoxysilane, isobutyl-sec-butyldimethoxysilane and isopropyl-sec-butyldimethoxysilane. In an embodiment, the external donor is CMDS.

A catalyst system formed according to the process described above shows high activity and high hydrogen response with controlled morphology characteristics in olefin polymerization, especially propylene polymerization. In particular, the activity of the catalyst system is about 35,000 to about 56,000 g polymer/g catalyst/hour. The catalyst system may be used under suitable polymerization conditions to polymerize olefin monomers, for example alpha-olefin monomers such as ethylene, propylene, butene, and combinations thereof, into homopolymers or copolymers. In an embodiment, polypropylene formed from the catalyst contains about 0.7 to about 7.0 wt. % xylene solubles, thus indicating a low level of the atactic form of the polymer. Less than about 1 wt. % of the polypropylene particles are fines (i.e., less than 106 microns in size). The bulk density of the polypropylene is about 0.36 to about 0.43 g/cm³. The molecular weight of the polymer can be controlled to achieve a relatively high MFR, i.e., from about 2 to about 100 g/10 min., due to its good response to $H_2$. Weight average polymer particle size ($d_{50}$) is about 150 to about 500, and span (($d_{90}$–$d_{10}$)/$d_{50}$) is about 0.5 to about 3.0. The molecular weight distribution (MWD=$M_w/M_n$) of the polymer, which ranges from about 6 to about 10, is also acceptable. Furthermore, the crystallinity (also referred to as isotacticity or mmmm as measured by $^{13}C$ NMR) of the polymer ranges from about 94.0 to about 97.0 mol %, suggesting that the polymer may be suitable for film, fiber, and injection molding applications.

EXAMPLES

The invention having been generally described, the following examples are given as particular embodiments of the invention and to demonstrate the practice and advantages hereof. It is understood that the examples are given by way of illustration and are not intended to limit the specification or the claims to follow in any manner.

Example 1

The pre-catalyst component sample was prepared in accordance with the present invention and then used to prepare a polypropylene sample. Some of the compounds required to prepare the catalyst component sample, i.e., 2-ethylhexanol, tri-n-butylphosphate (BP), di-n-butylphthalate (D"BP), $TiCl_4$, and 1,2-dichloroethane (DCE) were purchased from Aldrich Chemical Company and were used as received. A butylethylmagnesium (BEM) solution containing 24.7 wt. % BEM and 0.47 wt. % TEAL in heptane was purchased from Akzo Nobel and used as received. Toluene and hexane were purchased from Aldrich and dried over activated alumina in preparation for this experiment.

The support for the pre-catalyst sample was prepared by first charging a round bottom flask with 13.3 g (24.6 mmols) of the BEM solution and 25 mL of toluene. A solution of 2-ethylhexanol in toluene (23 ml of 2.2 M solution) was added over one hour with stirring. The resulting solution was allowed to stir for an additional one hour. Next, 6.6 mL (24.2 mmols) of BP was added to the mixture and stirred for 15 minutes. Then $TiCl_4$ in toluene was added (50 mL of a 1.92 M solution) drop-wise to the mixture over a period of one hour. A precipitate was observed after approximately 1.0 molar equivalents of $TiCl_4$ had been added. After completing the $TiCl_4$ addition, the mixture was stirred for an additional one hour and then allowed to stand undisturbed. The supernatant was thereafter decanted via a cannula. Then 100 mL of toluene was added to the solid precipitate, and the slurry was stirred for 5 minutes. After allowing the solid to settle, the supernatant was removed.

Subsequently, 80 mL of toluene was added to the solid support, followed by heating the slurry to 85° C. Next, 790 μL (2.96 mmol) of D"BP was added to the slurry, and the slurry was stirred for 10 minutes. At this point, 8.1 mL (73.4 mmols) of $TiCl_4$ was added to the slurry, and the slurry was allowed to react at 85° C. for 1 hour. The solid in the slurry was allowed to settle, and the supernatant was removed. Then 80 mL of toluene was added to the solid, and the resulting slurry was heated to 85° C. Subsequently, 8.1 ml of $TiCl_4$ was again added to the slurry, and the slurry was allowed to react at 85° C. for 1 hour. The supernatant was removed, and the solid was allowed to cool to ambient temperature. Next, the solid was treated with DCE by adding 80 mL of 1,2-dichloroethane to the solid and stirring the slurry for 5 minutes. After allowing the solid to settle, the supernatant was removed. The solid was then washed with hexanes (4×80 mL) and thereafter optionally dried under vacuum at a temperature of 50° C. for 15 minutes.

Polymerization: Propylene was polymerized using a laboratory scale, 2 liter, Zipperclave batch polymerization reactor. All traces of moisture and air were expelled from the polymerization reactor by heating it to a temperature above 100° C. for a minimum of 20 minutes while constantly purging it with dry nitrogen. After allowing the reactor to cool to ambient temperature (25° C.) under nitrogen, 16 mmol of $H_2$ (0.09 mol %) and 0.7 L of propylene were introduced to the reactor. The $H_2$ and propylene were stirred at 1300 rpm. Then 1.0 mmol of triethylaluminum (TEAL) and 0.1 mmol of cyclohexylmethyldimethoxysilane (CMDS) were added to a 40 cc tubular reaction vessel to serve as the co-catalyst and the external electron donor, respectively. After allowing the TEAL, CMDS, and 10 mg of the pre-catalyst in a mineral oil suspension to contact for about 1 minute, the reaction vessel was attached to an entry point on the reactor. The contents of the reaction vessel and 0.7 L of ambient temperature propylene were flushed into the reactor. The total amount of liquid propylene present in the reactor was about 1.4 L (720 g). The reactor temperature was then raised to 70° C. The polymerization reaction was allowed to proceed for one hour, at which point it was terminated by venting the excess propylene. After allowing the reactor to cool to ambient temperature, the polymer product was removed from the reactor, dried, weighed, and analyzed. The Al/Ti molar ratio for the reaction was calculated by dividing the molar amount of the co-catalyst by the molar amount of the pre-catalyst. The Al/Si molar ratio was calculated by dividing the molar amount of the co-catalyst by the molar amount of external electron donor, with a resultant molar ratio of about 10. Catalyst and polymer properties for the Examples are shown below in Table 1. Xylene solubles (XS) was measured by dissolving the polymer in hot xylene, cooling the solution to 0° C., and precipitation of the isotactic portion. The XS % is that portion of the original amount that remained soluble in the cold xylene. Melt flow rate was measured according to ASTM D 1238-95 Standard Test Method for Flow Rates of Thermoplastics by Extrusion Plastometer, 2060 g load at 230° C.). Bulk density was measured according to ASTM D 1895. Average particle size was determined via sieve screening. Molecular weight distribution was determined via gel permeation chromatography (GPC).

TABLE 1

|  | Ex. 1 | Ex. 2 | Ex. 3 | Comp. Ex. 1 | Comp. Ex. 2 |
| --- | --- | --- | --- | --- | --- |
| Polypropylene (PP) Production Rate (g PP/g catalyst/h) | 36,500 | 35,000 | 47,000 | 32,000 | 40,500 |
| Xylene Solubles in the PP (wt %) | 3.6 | 1.7 | 1.8 | 1.32 | 1.16 |
| Melt Flow Rate of the PP (dg/min) | 4.6 | 2.7 | 18.0 | 1.6 | 5.0 |
| Bulk Density (g/cm$^3$) | 0.32 | 0.36 | 0.36 | 0.47 | 0.48 |
| Average Particle Size (μm) ($d_{50}$) | 275 | 340 | — | 717 | — |
| Wt % $d_{90}$/wt % $d_{10}$ | 3.0 | 4.68 | — | 3.31 | — |
| Span [$d_{90}-d_{10}/d_{50}$] | 1.05 | 1.87 | — | 3.01 | — |
| Fines in the PP | <1 wt. % under 106 μm | </wt % | — | 1.8 wt % | — |
| Molecular Weight Distribution ($M_w/M_n$) | 6.8 | 6.8 | 7.0 | 8.1 | — |

TABLE 1-continued

|  | Ex. 1 | Ex. 2 | Ex. 3 | Comp. Ex. 1 | Comp. Ex. 2 |
|---|---|---|---|---|---|
| Elemental Analysis (wt. %) | Ti = 1.8 | Ti = 2.0 | Ti = 2.0 | | |
| | Mg = 20.6 | Mg = 18.1 | Mg = 18.1 | | |
| | Cl = 64.0 | Cl = 72.1 | Cl = 72.1 | | |
| Crystallinity (mmmm) | 94.5 | 95.8 | | | |

Based on these results, the catalyst support was receptive to the incorporation of D"BP as the internal donor and to treatment with $TiCl_4$. The catalyst performed with a high activity that was greater than 35,000 g PP/g catalyst/hour. The catalyst imparted desirable characteristics on the PP resin, which appeared as agglomerated spheroidal particles.

Example 2

The procedure of Example 1 was followed except that 1.5 equivalent of BP instead of 1.0 equivalent of BP was used to prepare the catalyst support, thereby forming a pre-catalyst sample from which a PP sample was formed. The PP sample was prepared using 0.09 mol % $H_2$. The resultant fluff particle size was larger ($d_{50}$=340 μm) than that found from Example 1 ($d_{50}$=275 μm).

As shown in Table 1, the melt flow rate of the PP decreased as the amount of BP was increased from 1.0 equivalent to 1.5 equivalent. On the other hand, the xylene solubles content decreased, the crystallinity increased, and the bulk density increased as the amount of BP was increased from 1.0 equivalent to 1.5 equivalent, thus achieving improved polymer properties.

Example 3

The procedure of Example 1 was followed except that 1.5 equivalent of BP instead of 1.0 equivalent of BP was used to prepare a pre-catalyst sample, and a PP sample was prepared using 0.45 mol % $H_2$ instead of 0.09 mol % $H_2$.

Example 4

The procedure of Example 1 was followed except that 1.5 equivalent of BP instead of 1.0 equivalent of BP was used to prepare a pre-catalyst sample, and a PP sample was prepared using 0.02 mmol of CMDS instead of 0.10 mmol.

Example 5

The procedure of Example 1 was followed except that 1.5 equivalent of BP instead of 1.0 equivalent of BP was used to prepare a pre-catalyst sample, and a PP sample was prepared using 0.02 mmol of CMDS instead of 0.10 mmol and 0.45 mol % $H_2$ instead of 0.09 mol % $H_2$.

Comparative Example 1

A commercially available Ziegler-Natta catalyst was purchased from Toho Titanium, Inc. for comparison with the catalyst of the present invention. The catalyst was used to prepare a PP sample in accordance with the polymerization procedure described in Example 1. The PP sample was prepared using 0.08 mol % $H_2$.

Comparative Example 2

The same commercially available Ziegler-Natta (ZN) catalyst purchased from Toho Titanium, Inc. was used to prepare a PP sample in accordance with the polymerization procedure described in Example 1 except that the PP sample was prepared using 0.40 mol % $H_2$.

Comparative Example 3

The same commercially available Ziegler-Natta (ZN) catalyst purchased from Toho Titanium, Inc. was used to prepare a PP sample in accordance with the polymerization procedure described in Example 1 except that the PP sample was prepared using 0.02 mmol of CMDS instead of 0.10 mmol and 0.08 mol % $H_2$ instead of 0.09 mol % $H_2$.

Comparative Example 4

The same commercially available Ziegler-Natta (ZN) catalyst purchased from Toho Titanium, Inc. was used to prepare a PP sample in accordance with the polymerization procedure described in Example 1 except that the PP sample was prepared using 0.02 mmol of CMDS instead of 0.10 mmol and 0.4 mol % $H_2$ instead of 0.09 mol % $H_2$.

Figure 1:
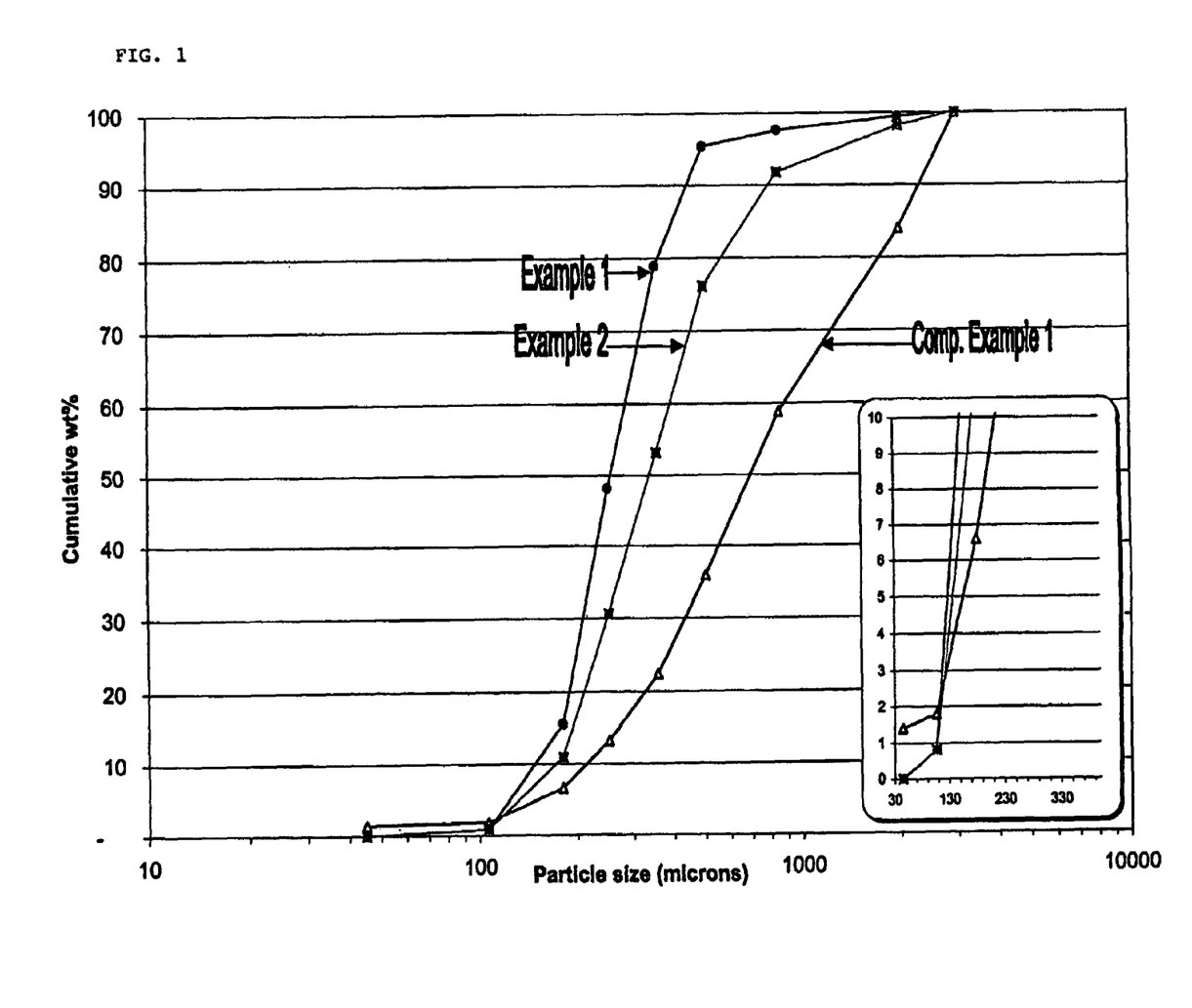
FIG. 1 depicts the relative particle size distributions of the PP samples formed in Examples 1 and 2 and in Comparative Example 1.

FIG. 1 compares the particle size distributions of PP samples from examples 1 and 2, which were formed in accordance with the present invention, to the particle size distribution of PP sample from comparative example 1, which was formed using a conventional ZN catalyst available from Toho. Example 2 fluff contained larger particles than did example 1 indicating that increasing the amount of BP used increases the fluff particles size. PP from examples 1 and 2 advantageously exhibited narrower particle size distributions than from comparative example 1 The data plotted in FIG. 1 is provided in Table 2.

TABLE 2

| Particle | Cumulative weight % | | |
|---|---|---|---|
| Size (μm) | Ex. 1 | Ex. 2 | Comp. Ex. 1 |
| <45 | 0.0 | 0.0 | 1.4 |
| 45–106 | 0.8 | 0.8 | 1.8 |
| 106–180 | 15.5 | 10.9 | 6.6 |
| 180–250 | 48.1 | 30.6 | 13.2 |
| 250–355 | 78.9 | 53.1 | 22.4 |
| 355–500 | 95.4 | 76.1 | 35.8 |
| 500–850 | 97.6 | 91.8 | 58.8 |
| 850–2000 | 99.4 | 98.2 | 84.0 |
| >2000 | 100.0 | 100.0 | 100.0 |

Figure 2:
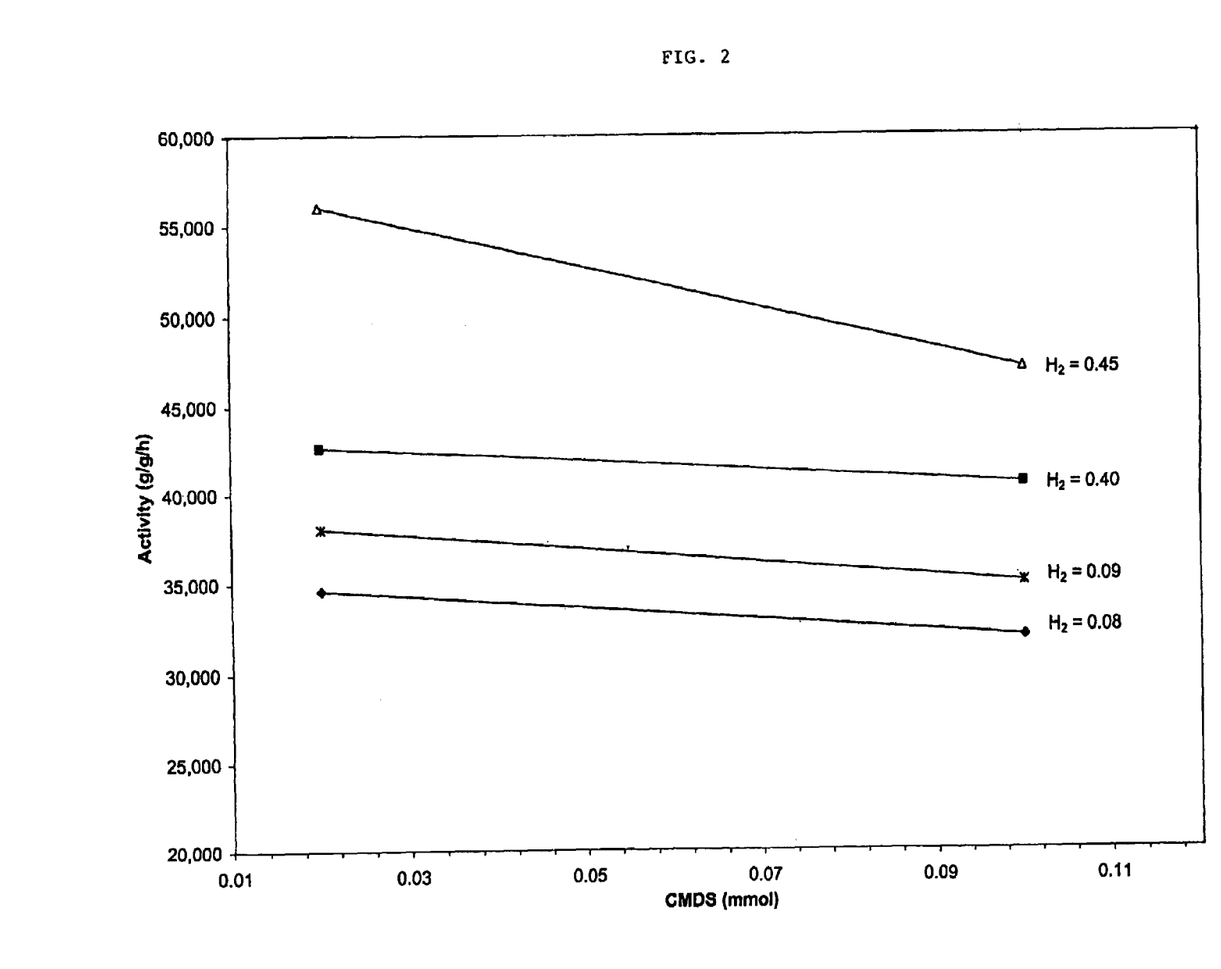
FIG. 2 depicts the relative activities of the catalysts formed in Examples 2–5 and in Comparative Examples 1–4

FIG. 2 compares the catalyst activities of examples 2–5, which were formed in accordance with the present invention, to the catalyst activities of the comparative examples 1–4 which were formed using a conventional ZN catalyst available from Toho. More specifically, FIG. 2 plots catalyst activity as a function of the amount of CMDS used as the external donor. The catalyst activity slightly decreased as the amount of CMDS was increased. The catalyst samples of examples 2–5 exhibited higher activities than did the comparative examples 1–4. Further, the catalysts generally exhibited higher activities when the amount of $H_2$ used to form PP resins was increased. The data plotted in FIGS. 2–4 is provided in Table 3.

Figure 3:
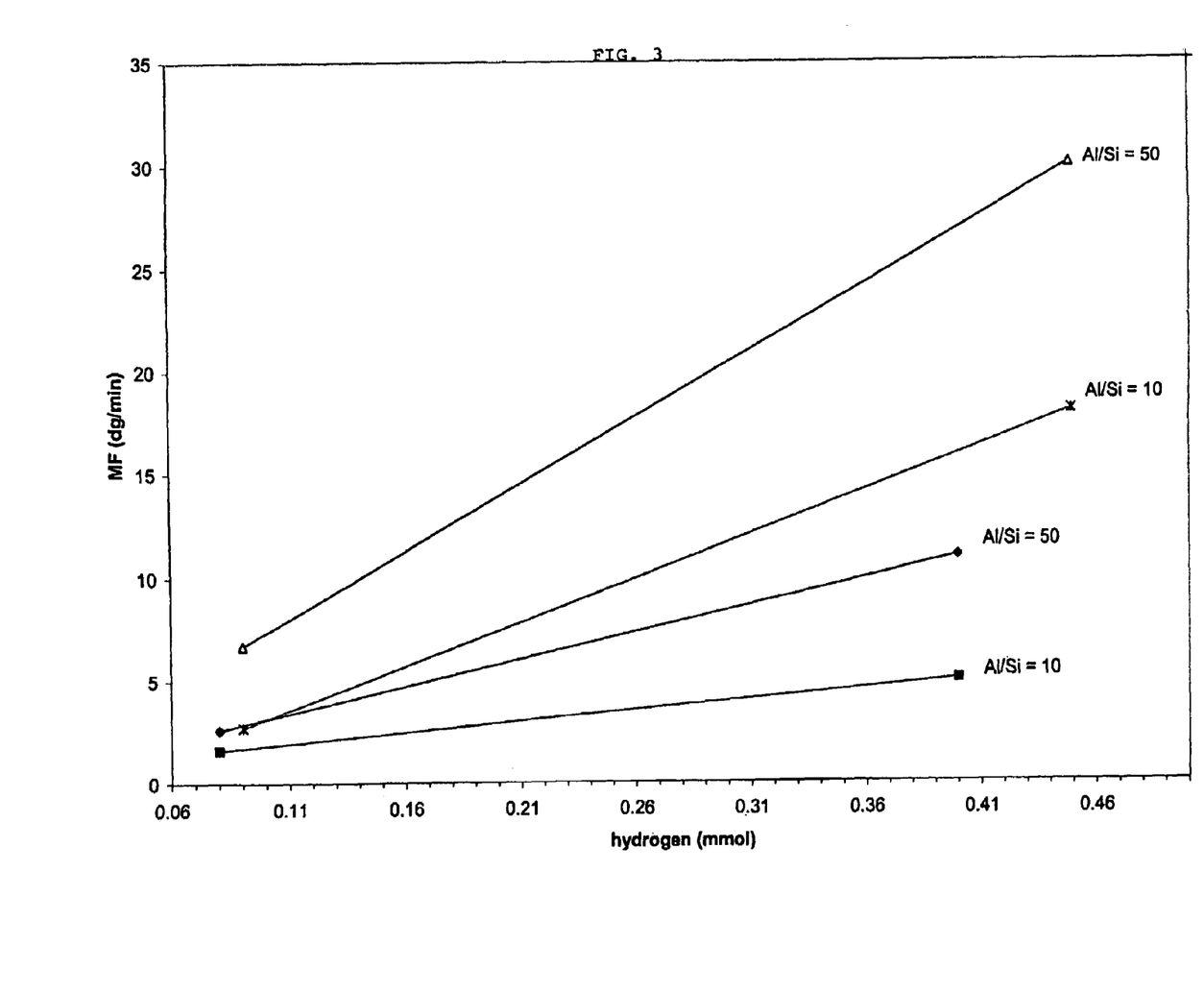
FIG. 3 depicts the relative hydrogen responses the PP samples formed in Examples 2–5 and in Comparative Examples 1–4.

FIG. 3 compares the hydrogen responses of catalysts from examples 2–5, which were formed in accordance with the present invention, to the hydrogen responses of the comparative examples 1–4. More specifically, FIG. 3 plots melt flow (MF) rate as a function of the amount of $H_2$ used to terminate the growth of the respective PP chains. The MF rate of the resulting PP resins generally increased as the amount of $H_2$ was increased. The catalyst samples of examples 1 and 2 of the present invention provided higher $H_2$ responses than did the comparative catalyst examples.

Figure 4:
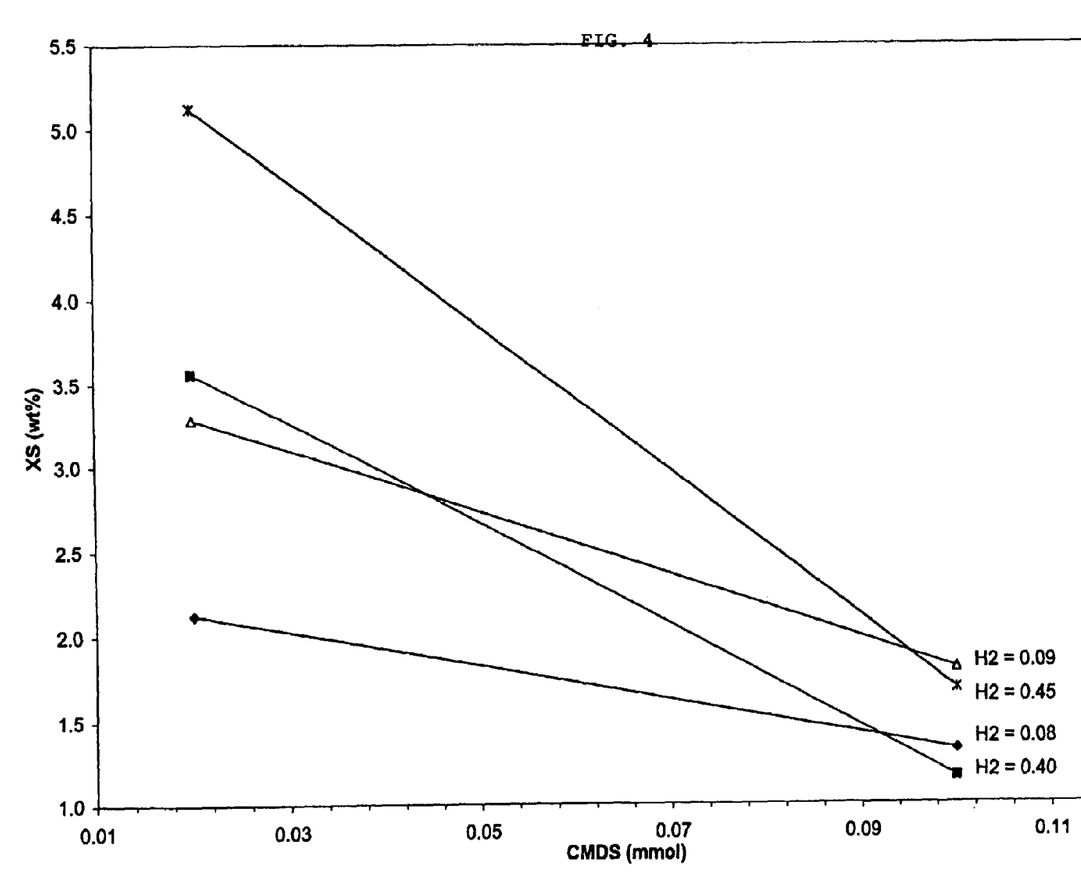
FIG. 4 depicts the relative concentrations of xylene solubles in the PP samples formed in Examples 2–5 and in Comparative Examples 1–4.

FIG. 4 compares the donor responses of catalyst examples 2–5, which were formed in accordance with the present invention, to the external donor responses of comparative examples 1–4, which were formed using the Toho catalyst. More specifically, FIG. 4 plots the concentration of xylene solubles as a function of the amount of CMDS used as the external donor. The amount of xylene solubles in the PP resin generally decreased as the amount of CMDS was increased, indicating that the atactic form of the polymer decreased as the amount of external electron donor was increased. The catalyst from examples 2–5 of the present invention provided higher donor responses than did the analogous comparative examples, 1–4.

TABLE 3

| Catalyst | H2 (mol %) | CMDS (mmol) | Activity (g/g/h) | MF (dg/min) | XS (wt %) |
|---|---|---|---|---|---|
| Example 2 | 0.09 | 0.10 | 35,000 | 2.7 | 1.7 |
| Example 3 | 0.45 | 0.10 | 47,000 | 18.0 | 1.8 |
| Example 4 | 0.09 | 0.02 | 38,000 | 6.7 | 5.1 |
| Example 5 | 0.45 | 0.02 | 56,000 | 30.0 | 3.3 |
| Comparative Example 1 | 0.08 | 0.10 | 32,000 | 1.6 | 1.3 |
| Comparative Example 2 | 0.40 | 0.10 | 40,500 | 5.0 | 1.2 |
| Comparative Example 3 | 0.08 | 0.02 | 34,600 | 2.6 | 2.1 |
| Comparative Example 4 | 0.40 | 0.02 | 42,600 | 11.0 | 3.6 |

The catalyst system of the present invention therefore provides for a narrower particle size distribution, a higher catalyst activity, a higher hydrogen response, and a higher external donor response than did the Toho catalyst.

While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Accordingly, the scope of protection is not limited by the description set out above, but is only limited by the claims which follow, that scope including all equivalents of the subject matter of the claims.

What is claimed is:

1. A process for forming a pre-catalyst for the polymerization of olefins, comprising:
   (a) combining a magnesium alkyl compound with an alcohol to form a magnesium alkoxide compound;
   (b) combining the magnesium alkoxide compound with a phosphorous compound to form a mixture; and
   (c) combining the mixture with a precipitating agent to form the pre-catalyst.

2. The process of claim 1, wherein the alcohol is represented by the formula ROH, wherein R is an alkyl group containing about 1 to 20 carbon atoms.

3. The process of claim 1, wherein the alcohol is 2-ethyl hexanol.

4. The process of claim 2 wherein the magnesium alkyl compound is of the formula $Mg(R')_2$, where R' may be the same or different alkyl group having about 1 to 10 carbon atoms.

5. The process of claim 3 wherein the magnesium alkyl compound is butylethylmagnesium.

6. The process of claim 1, wherein the phosphorous compound is represented by the formula:

$$PX_n$$

where n is 3, 4, or 5, and each X may be the same or different and is selected from the group consisting of group 17 elements, group 18 elements, R, ChR, $(RO)_2P(O)$, and $(RO)_2P(O)O$, and where Ch represents a chalcogen and R represents a hydrogen or a hydrocarbyl group.

7. The process of claim 1, wherein the phosphorous compound is tri-n-butylphosphate.

8. The process of claim 6, wherein the phosphorous compound is tri-n-butylphosphate.

9. The process of claim 1, wherein the precipitating agent is titanium tetrachloride.

10. The process of claim 8, wherein the precipitating agent is titanium tetrachloride.

11. The process of claim 1, further comprising combining the pre-catalyst with an internal donor to form a first slurry.

12. The process of claim 11, wherein the internal donor is di-n-butylphthalate.

13. The process of claim 10, further comprising combining the pre-catalyst with di-n-butylphthalate to form a first slurry.

14. The process of claim 11, further comprising combining the first slurry with titanium tetrachloride to form a second slurry.

15. The process of claim 13, further comprising combining the first slurry with titanium tetrachloride to form a second slurry.

16. The process of claim 14, further comprising combining the second slurry with titanium tetrachloride to form a third slurry.

17. The process of claim 15, further comprising combining the second slurry with titanium tetrachloride to form a third slurry.

18. The process of claim 1 further comprising adding at least one co-catalysts to the pre-catalyst.

19. The process of claim 18 wherein at least one co-catalyst is an organoaluminum compound.

20. The process of claim 18 further comprising adding at least one external electron donors to the pre-catalyst and co-catalyst.

21. The process of claim 20 wherein at least one external electron donor is an organosilicon compound.

22. The process of claim 20 wherein the co-catalyst is triethyl aluminum and the external electron donor is cyclohexylmethyldimethoxysilane.

23. A process for Loaning a pre-catalyst for the polymerization of olefins, comprising:
   (a) combining butylethylmagnesium with an alcohol to form a magnesium alkoxide compound;
   (b) combining the magnesium alkoxide compound with a phosphorous compound to form a mixture; and
   (c) combining the mixture with titanium tetrachloride to form the pre-catalyst.

24. A process for forming a pre-catalyst for the polymerization of olefins, comprising:
   (d) combining butylethylmagnesium with 2-ethyl hexanol to form a magnesium alkoxide compound;
   (e) combining the magnesium alkoxide compound with a phosphorous compound to form a mixture; and
   (f) combining the mixture with a precipitating agent to form the pre-catalyst.

* * * * *